(12) United States Patent
Rockwell et al.

(10) Patent No.: US 12,734,658 B1
(45) Date of Patent: Sep. 15, 2026

(54) O-RING INSTALLATION DEVICE

(71) Applicant: Caterpillar Inc., Peoria, IL (US)

(72) Inventors: Andrew D. Rockwell, Marana, AZ (US); Jonathan R. Chittenden, West Lafayette, IN (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 19/192,543

(22) Filed: Apr. 29, 2025

(51) Int. Cl.
*B25B 27/00* (2006.01)
*B23P 15/06* (2006.01)
*F16J 1/00* (2006.01)
*F16J 9/00* (2006.01)

(52) U.S. Cl.
CPC .......... *B25B 27/0092* (2013.01); *B23P 15/06* (2013.01); *F16J 1/00* (2013.01); *F16J 9/00* (2013.01)

(58) Field of Classification Search
CPC ..... B25B 27/0092; B25B 27/00; B23P 15/06; B23P 15/00; F16J 9/00; F16J 1/00
USPC .................................................. 29/428, 592
See application file for complete search history.

(56) References Cited

U.S. PATENT DOCUMENTS

| | | | | |
|---|---|---|---|---|
| 6,421,897 | B1 * | 7/2002 | Amaral | B23P 19/084 29/235 |
| 11,440,170 | B2 | 9/2022 | Li | |
| 11,633,819 | B1 * | 4/2023 | Chittenden | B23P 19/084 29/235 |
| 2022/0324071 | A1 | 10/2022 | Lu | |

FOREIGN PATENT DOCUMENTS

| | | | | | |
|---|---|---|---|---|---|
| CN | 105537923 | A | | 5/2016 | |
| CN | 112706121 | A | | 4/2021 | |
| DE | 102005007087 | A | | 9/2006 | |
| FR | 253750 | A | * | 7/1987 | B25B 27/00 |

* cited by examiner

*Primary Examiner* — Lawrence Averick

(57) ABSTRACT

A device for installing O-rings within a cylinder is disclosed and includes a top plate, a central plate, and a bottom plate each disposed along a plate axis. The top plate includes a tool catch extending out from the top face and a slot extending through the top plate and tool catch towards the plate axis. The central plate and bottom plate each include a circumferential surface and a guide extending out from a top surface. The guide has an engagement surface disposed proximal to the circumferential surface that engages an inner surface of an O-ring and hold it such that an outer surface of the O-ring is in line with the circumferential surface.

8 Claims, 9 Drawing Sheets

O-RING INSTALLATION DEVICE

TECHNICAL FIELD

The present disclosure relates generally to a device for installing an O-ring, and more particularly to a device for installing an O-ring within an inner diameter of a structure.

BACKGROUND

Installing O-rings is a task that requires precision and may be time-consuming even for experienced operators. Installing O-rings on an outer diameter of an object is generally straightforward, as the outer diameter is generally accessible and visible to the operator. However, installing O-rings into a groove within an inner diameter of an object is generally a more challenging endeavor, as such a groove may not be easily accessible or visible. Accordingly, there are plenty of opportunities for O-rings to be installed incorrectly, or even accidentally dropped within the object where they may be difficult to remove.

Although simply installing O-rings into such a groove of an object is challenging enough, the operator must also ensure the O-rings do not suffer any damage during the installation process. If any of O-rings are pinched, cut, twisted, or otherwise damaged or deformed, the O-rings may not make an effective seal. The problems above may be further compounded in situations where multiple O-rings are installed in close proximity to one another.

U.S. Ser. No. 11/633,819B1 describes an O-ring installation tool. The tool of the '819 patent includes multiple circular plates stacked on top of one another, each plate having an outer surface. On top of each plate are multiple plate guides designed to hold an O-ring. Between each plate guide is a finger that is connected to a central movement device. The central movement device moves the fingers towards the peripheral surface, such that they push the O-ring towards the peripheral surface. The O-ring installation tool of the '819 patent represents one possible design; however, future designs may present additional options for installing O-rings.

SUMMARY

In an aspect of the present disclosure, there is a device for installing a plurality of O-rings within a cylinder. The device includes a top plate disposed along a plate axis which includes a perimeter surface, a top face opposite a bottom face, a tool catch extending outwards from the top face, the tool catch disposed proximal to the perimeter surface, and a first slot extending through the perimeter surface and towards a center of the top plate, the first slot splitting the tool catch into a plurality of tool catch segments. The device further includes a central plate disposed along the plate axis which includes a first circumferential surface, a second slot extending through the first circumferential surface towards the plate axis, a top surface opposite a bottom surface, and a first guide extending from the top surface, the first guide disposed proximal to the first circumferential surface and including a first engagement surface configured to engage an inner portion of one of the O-rings and position it such that an outer portion of the O-ring is generally in line with the first circumferential surface but does not extend past the first circumferential surface. The device also includes a bottom plate disposed along the plate axis which includes a second circumferential surface having the same diameter as the first circumferential surface, a top side opposite a bottom side, a groove extending through a portion of the first circumferential surface and the top side and towards a plate axis of the bottom plate, and a second guide extending from the top side, the second guide disposed proximal to the second circumferential surface and including a second engagement surface configured to engage an inner surface of a different O-ring than first engagement surface and position it such that an outer surface of the O-ring is generally line with the second circumferential surface but does not extend past the second circumferential surface.

In another aspect of the present disclosure, there is a device for installing an O-ring within a groove of a cylinder. The device includes a top cap disposed along a central axis which includes a perimeter surface, a top face opposite a bottom face, a tool catch extending out from the top face, and a first slot extending through the perimeter surface and towards the central axis, the first slot splitting the tool catch into a plurality of tool catch segments. The device further includes a plate disposed under the top cap and along the central axis which includes a first circumferential surface, a second slot extending through the first circumferential surface and towards the central axis, a top surface opposite a bottom surface, and a plurality of first guides extending out from the top surface, the first guides each including a first engagement surface disposed proximal to the first circumferential surface and configured to engage an inner surface of one of the O-rings and position it such that an outer portion of the O-ring is generally in line with the first circumferential surface but does not extend past the first circumferential surface. The device further includes a plurality of first retention members slidably coupled to the top surface between the first guides, each including a second engagement surface configured to engage the inner surface of the same O-ring as the first engagement surface. The device additionally includes a first plate actuator connected to the first retention members and configured to slide the first retention members from a resting position to an actuated position. While in the resting position, the first engagement surfaces and second engagement surfaces are in line such that they generally create a continuous engagement surface around a majority of the plate, and while in the actuated position, the second engagement surfaces extend further outward than the first engagement surfaces.

In yet another aspect of the present disclosure, a method is provided for installing an O-ring within a cylinder using a device. The device includes a plurality of plates disposed along a plate axis, each plate including a circumferential surface and a slot extending through the circumferential surface and towards the plate axis. The device additionally includes a guide member extending from one of the plates and disposed between the plates, the guide member disposed proximal to the circumferential surface and including an engagement surface configured to engage an inner portion of the O-ring. The device further includes a tool catch proximal to the slot of the plate without the guide member and extending outwards from that plate. The device also includes a tool. The method includes disposing an O-ring along the engagement surface and between two of the plates. The method further includes positioning the tool such that it is at a peripheral edge of each of the slots of the plurality of plates, and moving the tool within each of the slots, towards the plate axis, and past a portion of the tool catch to pull a portion of the O-ring toward the plate axis such that the outer portion of the O-ring is in line with one of the circumferential surfaces. The method also includes removing the tool in an axial direction and rotating the tool assembly.

Other features and aspects of this disclosure will be apparent from the following description and the accompanying drawings.

DETAILED DESCRIPTION

Figure 1:
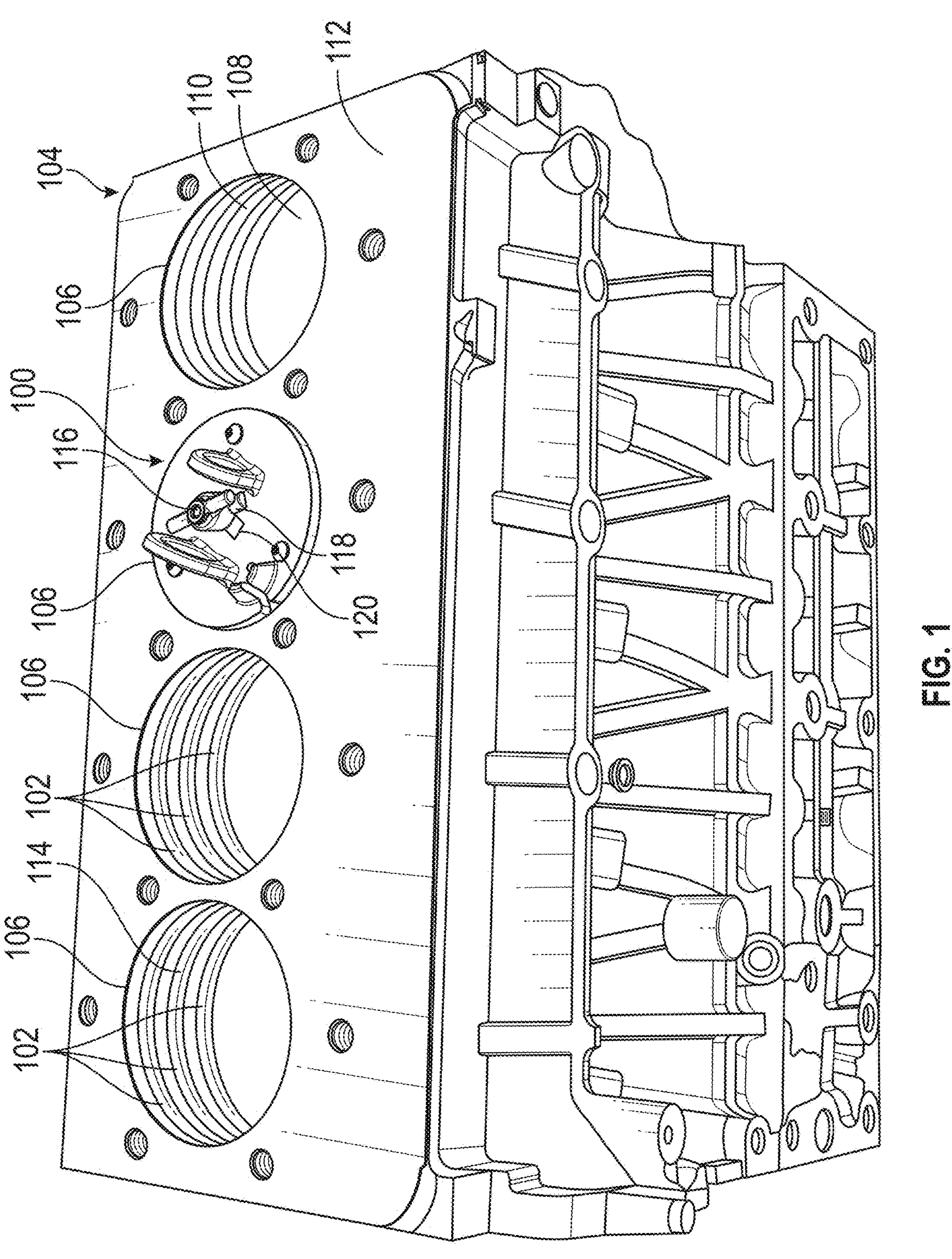
FIG. 1 is a perspective view depicting an O-ring installation device installing O-rings into an engine block.

FIG. 1 shows an O-ring installation device 100 installing a plurality of O-rings 102 into an engine block 104. An operator may load the O-rings 102 onto the device 100, and then place the device 100 into a bore 106 of the engine block 104. Afterwards, the operator may release the O-rings 102 from the device 100 and then pull the device 100 out of the engine block 104, leaving the O-rings 102 within the engine block 104. As illustrated, O-rings 102 have already been installed into the two leftmost bores 106 of the engine block 104, the device 100 is inserted into the third bore 106, and the rightmost bore 106 is empty and ready for O-rings 102 to be installed.

The bores 106 each have a cylindrical inner surface 108 containing multiple grooves 110. The bores 106 shown each have three grooves 110, each groove 110 being configured to receive an O-ring 102. The grooves 110 extend around the inner surface 108 of the bores 106, and the O-rings 102 are sized to fit within the grooves 110. While within the grooves 110, an inner diameter 114 of the O-rings 102 is visible.

The device 100 is shown engaging an outer face 112 of the engine block 104. The device 100 includes an actuator handle 116 and an actuator catch 120. The actuator handle 116 is configured to be rotated by an operator to trigger the device 100, and includes an actuator stop 118. The actuator stop 118 is a protrusion extending from the actuator handle 116. The actuator catch 120 is a channel within the device 100 configured to retain the actuator stop 118. When the actuator stop 118 is within the actuator catch 120, the actuator handle 116 is unable to be rotated. The actuator stop 118 shown has been pulled out of the actuator catch 120 and the handle 116 has been rotated, triggering the device 100 to push the O-rings 102 into the grooves 110.

In other embodiments, the actuator catch 120 may be a ramp in which the actuator stop 118 slides up or down when rotated. In such an embodiment, the actuator stop 118 is continually biased towards the resting position, where it is at the bottom of the ramp. In further embodiments, there may be no actuator stop 118 and/or actuator catch 120, or there may be multiple actuator stops 118 and/or actuator catches 120.

Figure 2:
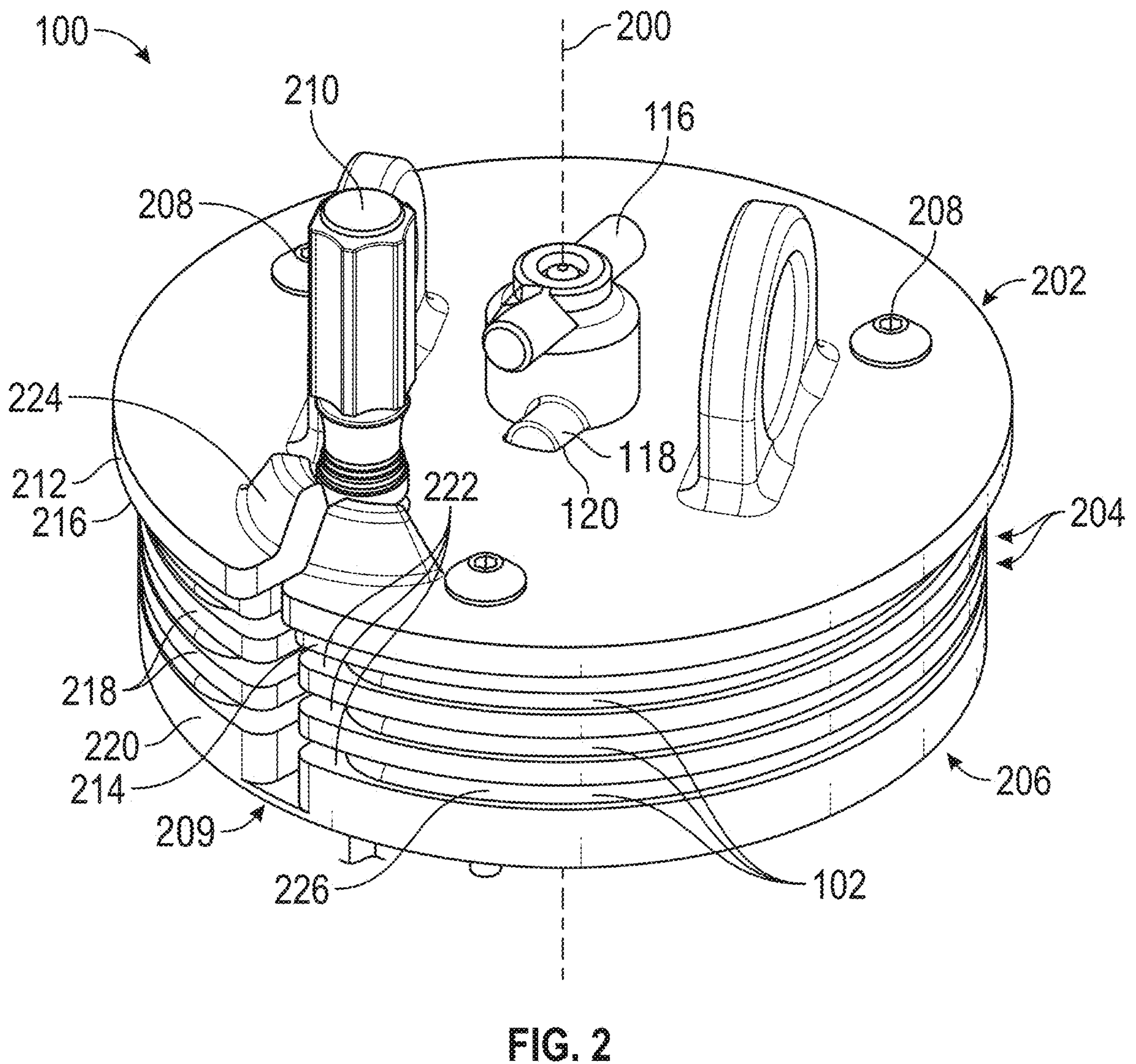
FIG. 2 is a top-side view of an O-ring installation device like shown in FIG. 1, the device having a tool holding multiple O-rings against the device.

Referring to FIG. 2, additional features of the O-ring installation device 100 are shown. There are three O-rings 102 shown positioned around the device 100 and ready to be installed within an object, such as the engine block 104 of FIG. 1. The device 100 includes a plate axis 200 extending axially through the device 100, a top plate 202, a plurality of middle plates 204 (here illustrated as 2 middle plates 204), and a bottom plate 206, each positioned along the plate axis 200 and held together by a plurality of plate fasteners 208. The device also includes a slot 209 extending radially into each of the plates, 202, 204, and 206. The slot 209 extends entirely through the top plate 202 and middle plates 204, however only partially through the bottom plate 206. A tool 210, illustrated as a screwdriver, is installed within the slot 209, the tool 210 holding the O-rings 102 against the device 100.

The top plate 202 has a first perimeter surface 212, a second perimeter surface 214, and a mating surface 216. The first perimeter surface 212 is a circular surface that is generally concentric with the plate axis 200. The second perimeter surface 214 is a circular surface that is also generally concentric with the plate axis 200. The second perimeter surface 214 is located below the first perimeter surface 212 and has a diameter that is smaller than the first perimeter surface 212. The mating surface 216 is disposed between the first perimeter surface 212 and the second perimeter surface 214. The mating surface 216 is generally perpendicular to the first perimeter surface 212 and/or the second perimeter surface 214, extending generally in the radial direction of the plate 202. The mating surface 216 is configured to engage another surface, such as the outer surface 112 of the engine block 104, and prevent the device 100 from moving fully into an object.

The middle plates 204 are generally similar, with each having a first circumferential surface 218. The first circumferential surface 218 is a circular surface that is generally concentric with the plate axis 200 and is shown having the same diameter as the second perimeter surface 214 of the top plate 202. The middle plates 204 further include a first engagement surface 334 and second engagement surface 336 (each shown and further described in FIGS. 3-5). The engagement surfaces, 334 and 336, are located behind the O-rings 102, and so are not visible in FIG. 2.

The bottom plate 206 has a second circumferential surface 220 that is generally concentric with the plate axis 200 and is shown having the same diameter as the first circumferential surface 218 of the middle plates 204. The second circumferential surface 220 is thicker than the first circumferential surface 218, or taller in the direction of the axis 200. The bottom plate 206 is otherwise substantially similar to the middle plates 204, as shown and described further in FIG. 3.

The engagement surfaces, 334 and 336, are closer to the plate axis 200 than the adjacent first circumferential surfaces 218 and/or second circumferential surface 220. Accordingly, there are a plurality of notches 222 formed around the device 100. The O-rings 102 are shown nested within the notches 222, such that there is one O-ring 102 within each notch 222.

A tool 210 is inserted through the device 100, and as shown the tool may be a screwdriver. The tool 210 engages an outer diameter 226 of the O-rings 102, as well as a tool catch 224, and pulls a portion of each of the O-rings 102 towards the plate axis 200 in the region of the slot 209. The tool 210 removes the slack from the O-rings 102 such that the inner diameter 114 of the O-rings contacts the engagement surfaces, 334 and 336, of the device 100. The tool catch 224 is a protrusion on the top plate 202 that holds the tool 210 generally parallel with the plate axis 200 such that it engages each of the O-rings 102 in a similar manner.

While the tool 210 is holding the O-rings 102 against the device 100 in the manner shown in FIG. 2, the outer diameter 226 of the O-rings 102 does not extend out past the first circumferential surface 218 and/or second circumferential surface 220. Accordingly, the device 100 may be installed within an inner surface 108 of a structure, such as the bore 106 in the engine block 104, without the O-rings 102 making contact with the bore 106 until the tool 210 is removed.

The diameter of the circumferential surfaces, 218 and 220, are smaller than the diameter of the inner surface 108. In such and embodiment, the surfaces, 218 and 220, do not contact the O-rings 102 seated within the grooves 110 when the O-ring installation device 100 is removed from the bore 106. However, in some embodiments they may be generally the same diameter.

Further, in other embodiments, the mating surface 216 has an angular relationship with the first perimeter surface 212. The mating surface may be at an angle between 30 and 60 degrees with respect to the first perimeter surface 212. In one example, the mating surface may be 45 degrees with respect to the first perimeter surface 212. In another embodiment, the mating surface may be below the second perimeter surface 214 instead of the first perimeter surface 212.

Figure 3:
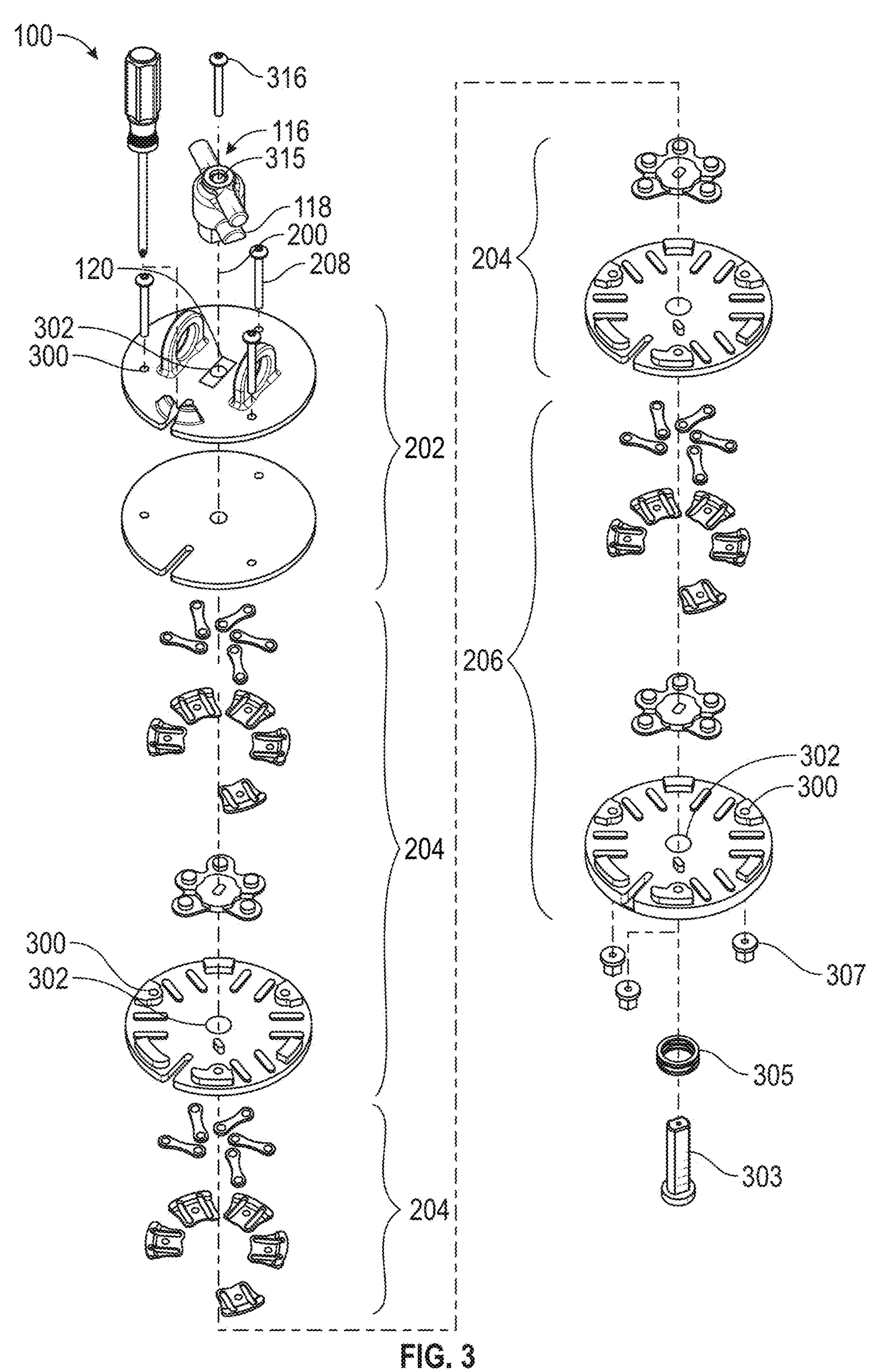
FIG. 3 is an exploded view of the O-ring installation device of FIG. 2.

FIG. 3 shows an exploded view of the O-ring installation device 100. Again, the device 100 generally includes a top plate 202, a plurality of middle plates 204, and a bottom plate 206. The device 100 also includes an actuator handle 116, an actuator shaft 303, a spring 305, and a plurality of plate fasteners 208 and plate nuts 307. Each of the top plate 202, middle plates 204, and the bottom plate 206 are disposed concentrically with respect to one another along the plate axis 200.

Each of the plates, 202, 204, and 206, have a plurality of fastener bores 300, through which the plate fasteners 208 are received. Each plate, 202, 204, and 206, also has an actuator bore 302, through which the actuator shaft 303 is received. Each of the plates, 202, 204, and 206, are shown with three fastener bores 300 that each accept one of the three fasteners 208. Each of the plates, 202, 204, and 206, are shown with a single actuator bore 302. The actuator bores 302 are shaped such that the actuator shaft 303 is free to pivot freely within the bores 302.

The actuator handle 116 is used to actuate the O-ring installation device 100 and includes a mounting aperture 315, a handle fastener 316, and an actuator stop 118. The mounting aperture 315 extends generally parallel with the plate axis 200 through the actuator handle 116 and is configured to receive the handle fastener 316. The handle fastener 316 connects the actuator handle 116 to the actuator shaft 303. The actuator stop 118 is a protrusion that extends from the actuator handle 116 generally in a generally perpendicular direction to the plate axis 200.

The spring 305 is disposed between the bottom plate 206 and the actuator shaft 303. The spring 305 provides a biasing force that pushes the actuator shaft 303 down and away from the bottom plate 206. The biasing force assists an actuator catch 120 with retaining the actuator stop 118. While the actuator catch 120 is within the actuator stop 118, the device 100 is in a resting position. The actuator shaft 303 is configured to pass through the device 100 and engage the rotational members 338 as well as the actuator handle 116.

The plate fasteners 208 are shown as bolts that are received through the fastener bores 300. The plate fasteners 208 extend downwards through the fastener bores 300 of the top plate 202, middle plates 204, and bottom plate 206, and each connect to a corresponding plate nut 307. The plate fasteners 208 and plate nuts 307 press each of the top plate 202, middle plates 204, and bottom plate 206 together.

Here, the device 100 is shown having a single top plate 202, two middle plates 204, and a single bottom plate 206. However, the device 100 may have any number of middle plates 204. Further, the device 100 may be without a top plate 202, middle plates 204, and/or bottom plate 206.

Figure 4:
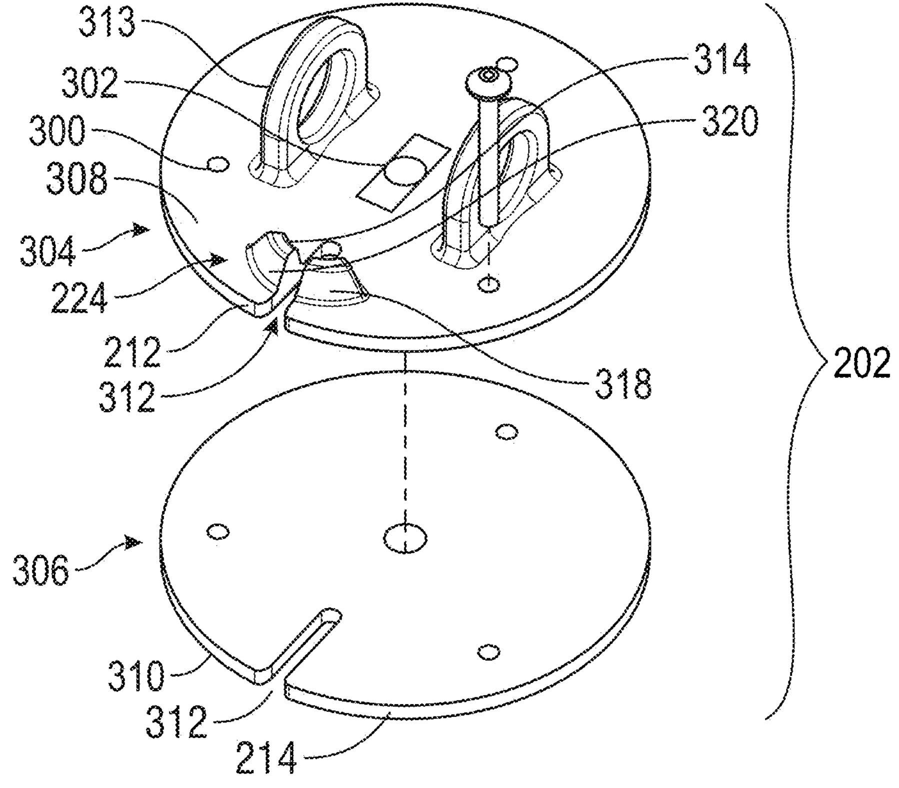
FIG. 4 is an exploded view of the top plate of FIG. 3.

FIG. 4 shows an exploded view of the top plate 202. The top plate 202 includes a top segment 304, a bottom segment 306, and a first slot segment 312. The top segment 304 includes a top face 308, the first perimeter surface 212, a plurality of handles 313, and the tool catch 224. The maximum diameter of the top surface 308 is defined by the first perimeter surface 212.

The handles 313 are tabs extending out from the top face 308 and are configured to be gripped and used by an operator to position the device 100. For example, the operator may grip the handles 313 to insert the device 100 into an object, move and/or rotate the device 100 within the object, and/or remove the device 100 from the object.

The tool catch 224 is a protrusion extending out from the top face 308 and includes a first segment 318 and a second segment 320. The first segment 318 and second segment 320 are separated from one another by the first slot segment 312. Both the first segment 318 and the second segment 320 include an engagement face 314. The engagement face 314 extends outward from the top face 308 at an angle away from the plate axis 200. The angle of the engagement face enables the tool catch 224 to engage differently sized tools 210.

The bottom segment 306 includes a bottom face 310 and the second perimeter surface 214. The bottom face 310 has a diameter defined by the second perimeter surface 214. When the top segment 304 and bottom segment 306 are mated, the bottom face 310 is opposite the top face 308. The first slot segment 312 extends radially through the first perimeter surface 212 and the second perimeter surface 214, through the tool catch 224, and towards the plate axis 200.

Figure 5:
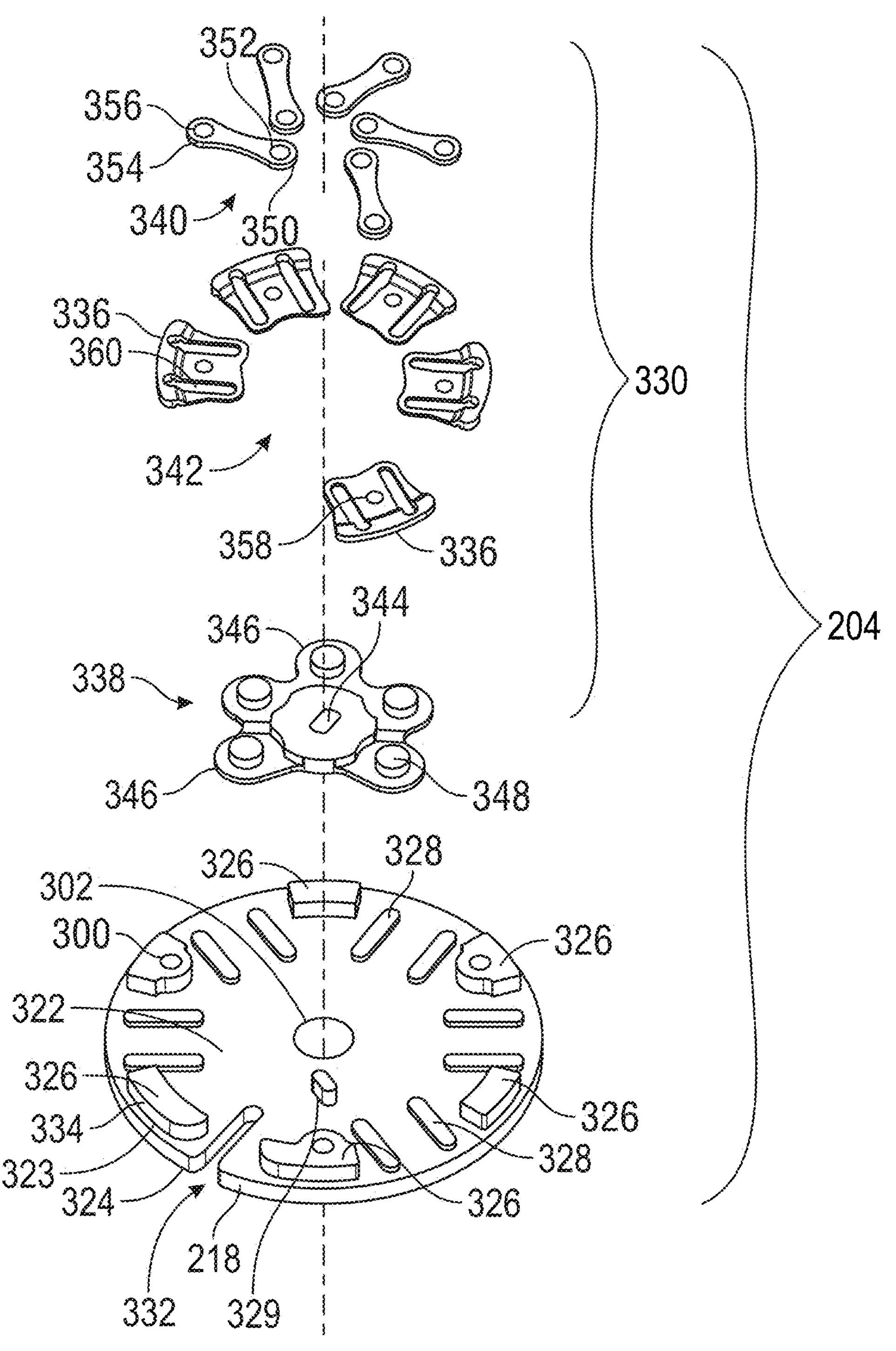
FIG. 5 is an exploded view of one of the middle plates of FIG. 3.

FIG. 5 shows an exploded view of one of the middle plates 204. The middle plate 204 shown includes a top surface 322, a bottom surface 324, a first circumferential surface 218, a plurality of plate guides 326, an actuation mechanism 330, a plurality of retention paths 328, a limiter 329, and a second slot segment 332.

The top surface 322 is opposite the bottom surface 324. The first circumferential surface 218 is a circular surface that extends between the top surface 322 and the bottom surface 324 and is generally concentric with the plate axis 200.

The plate guides 326 extend from the top surface 322 of the middle plates 204 in a circular pattern around the plate axis 200. The plate guides 326 each include a first engagement surface 334 disposed proximal to the first circumferential surface 218, creating a land 323 between the first engagement surface 334 and the first circumferential surface 218. The first engagement surface 334 is configured to engage an inner diameter 114 of an O-ring 102 and position it such that an outer diameter 226 of the O-ring 102 is generally in line with the first circumferential surface 218 but does not extend past the first circumferential surface 218.

The actuation mechanism 330 includes a rotational member 338, a plurality of links 340, and a plurality of retention members 342. The rotational member 338 is a plate disposed above the top surface 322 and around the plate axis 200. The rotational member 338 includes an actuator hole 344 and a plurality of arms 346. The actuator hole 344 is configured to accept the actuator shaft 303, however unlike the actuator bore 302, is shaped to engage and pivot with the actuator shaft 303. Accordingly, when the actuator shaft 303 is pivoted, the actuator shaft 303 engages the actuator hole 344, and the rotational member 338 is pivoted. The arms 346 extend away from the plate axis 200 and each includes an inner mounting peg 348.

The links 340 are each pivotally connected to the rotational member 338 and one of the retention members 342. The links 340 each include a first end 350 having an inner mounting hole 352 and a second end 354 having an outer mounting hole 356. The inner mounting hole 352 is pivotally coupled to the inner mounting peg 348. The outer mounting hole 356 is pivotally coupled to an outer mounting peg 358 of one of the retention members 342. The links 340 transfer the pivoting motion of the rotational member 338 to the retention members 342 such that pivoting of the rotational member 338 causes the retention members 342 to be pushed away from the plate axis 200 or pulled towards the plate axis 200.

The retention members 342 are slidably mated to the top surface 322 and are each disposed between a pair of plate guides 326. The retention members 342 each include a second engagement surface 336, an outer mounting peg 358, and a pair of retention channels 360. The second engagement surface 336 is generally parallel in an axial direction with the first circumferential surface 218 and/or second circumferential surface 220. The second engagement surface 336 is configured to engage the inner diameter 114 of the same O-ring 102 as the adjacent engagement surface 334.

The retention paths 328 are elongated protrusions that extend from the top surface 322. The retention paths 328 are slightly smaller than the retention channels 360 and are configured to each reside within the retention channels 360. The retention paths 328 guide the movement of the retention members 342 such that the retention members 342 are pushed or pulled in a linear manner towards and away from the plate axis 200.

The limiter 329 is a protrusion that extends from the top surface 322. The limiter 329 is configured such that the rotational member 338 may contact the limiter 329 while pivoting. When the rotational member 338 contacts the limiter 329, the rotational member 338 is restricted from pivoting further in the same direction.

The second slot segment 332 extends through the second circumferential surface 220 and towards the plate axis 200. The second slot segment 332 is shown as identical in width and length as the first slot segment 312 of the top plate 202.

Figure 6:
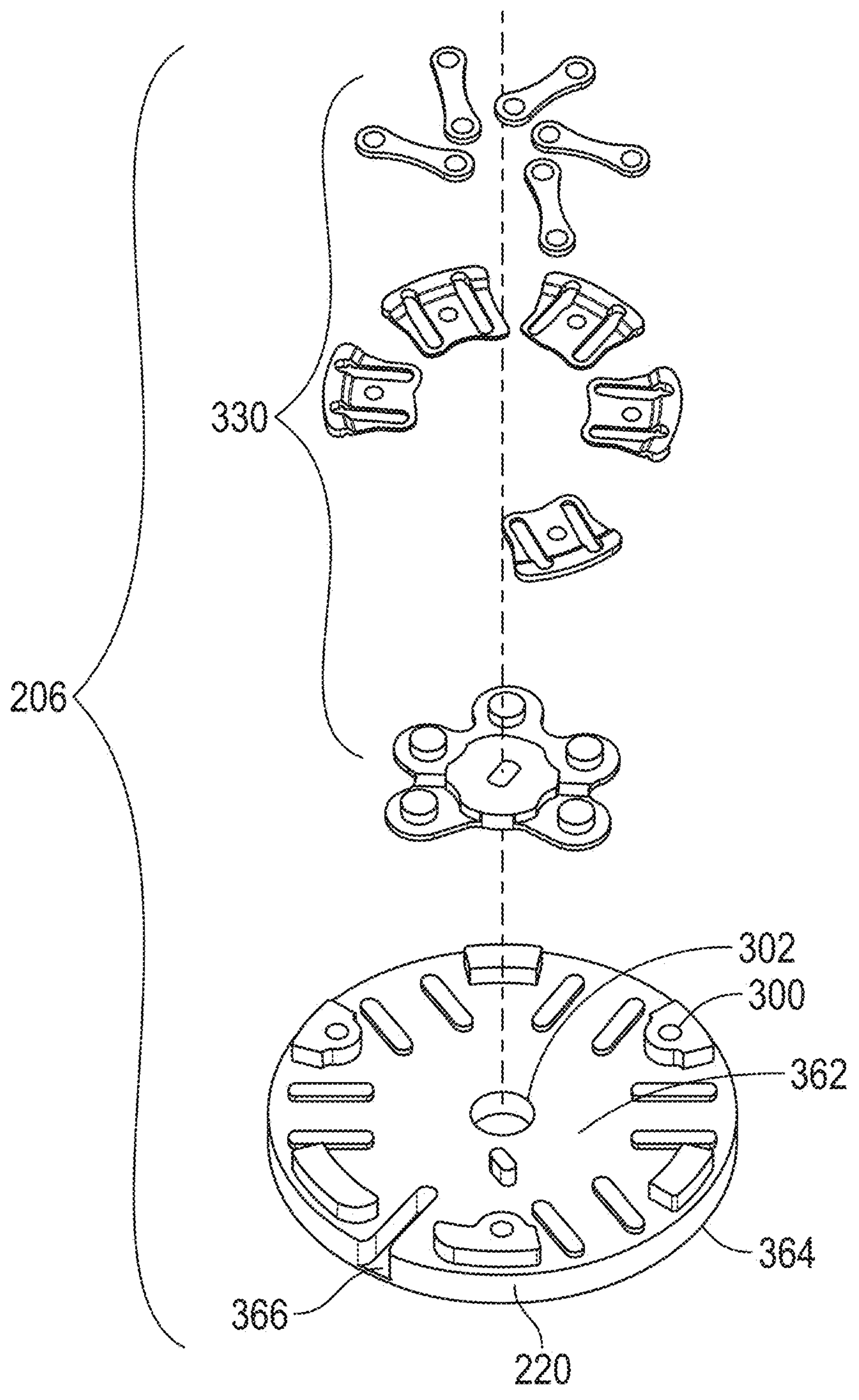
FIG. 6 is an exploded view of the bottom plate of FIG. 3.

FIG. 6 shows an exploded view of the bottom plate 206. The bottom plate 206 is disposed under the lowest middle plate 204. The bottom plate 206 is similar to the middle plates 204 and includes an actuation mechanism 330, retention paths 328, and limiter 329. The bottom plate 206 includes the second circumferential surface 220 as described above, as well as a top side 362, a bottom side 364, and a third slot segment 366.

The top side 362 is opposite the bottom side 364, each of the top side 362 and bottom side 364 defined by the second circumferential surface 220. The second circumferential surface 220 is a circular surface that extends between the top side 362 and bottom side 364 and is generally concentric with the plate axis 200.

The third slot segment 366 extends through a portion of the second circumferential surface 220 and towards the plate axis 200. The third slot segment 366 is generally the same length and width as the second slot segment 332. The third slot segment 366 extends through the top side 362, however does not extend through the bottom side 364. The third slot segment is further configured to engage the tool 210.

When assembled, the top of the plate guides 326 are configured to engage the bottom face 310 of the top plate 202 or the bottom surface 324 of a middle plate 204. The plate guides 326 and retention members 342 are each tall enough such that an O-ring 102 may fit between the plates, 202, 204, and 206. The distance between the plate guides 326 may generally match the height of the grooves 110. For example, the distance between the plate guides 326 may be generally 4.95+/−0.1 mm.

The land 323 is sized such that an O-ring 102 engaged with the engagement surfaces, 334 and 336, is held at but does not extend past the corresponding circumferential surface, 218 and 220. The depth of the land 323 may be deeper than the depth of the grooves 110. For example, the land 323 may be generally 3.53+/−0.1 mm deep. Further, the width of the land 323 is substantially identical at most portions of the land 323.

Each individual second engagement surface 336 is larger than either of its adjacent first engagement surfaces 334, and the second engagement surfaces 336 combine to contact a majority of the inner diameter 114 of the O-ring 102. For example, the second engagement surfaces 334 may be at least 50% of the total perimeter of the engagement surfaces, 334 and 336. In some embodiments the second engagement surfaces 336 may be generally 40 degrees each, or generally 200 degrees total, of the perimeter in the resting position. For example, the first engagement surfaces may be at least 33% of the total perimeter of the engagement surfaces, 334 and 336. In some embodiments the first engagement surfaces 334 may be generally 140 degrees of the perimeter in the resting position. Further, the combination of the first engagement surfaces 334 and second engagement surfaces 336 may combine for at least 90% of the perimeter. In one embodiment, the opening for the slot 209 may be generally 20 degrees of the perimeter in the resting position.

Figure 7:
FIG. 7 is a top-side view of an O-ring installation device with a top plate removed showing an actuation mechanism in a resting position.
Figure 7:
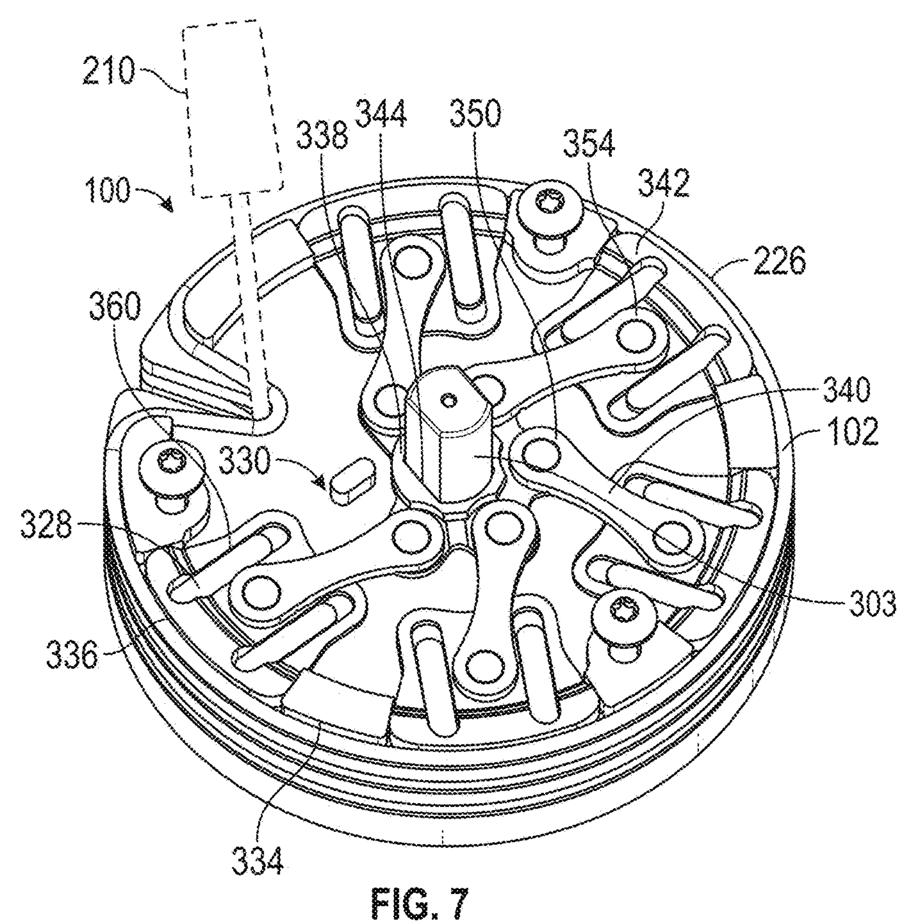

FIG. 7 is an isometric view of an O-ring installation device 100 with the top plate 202 removed and the actuation mechanism 330 in a resting position. As shown, the rotational member 338 is rotatably connected to the first end 350 of each of the links 340. The retention members 342 are shown rotatably coupled to the second end 354 of each of the links 340. Further, the retention paths 328 are within the retention channels 360. The retention paths 328 engage the retention channels 360 such that the retention members 342 may only move in a linear manner towards or away from the actuator shaft 303. The actuator shaft 303 is shown extending through the actuator hole 344, the shape of the actuator hole 344 configured to match the shape of the actuator shaft 303. The actuator shaft 303 is not pivoted, such that the actuation mechanism 330 is in a resting position.

While in the resting position, the links 340 are shown in a non-parallel relationship with the retention members 342. The first engagement surfaces 334 and second engagement surfaces 336 are disposed such that they generally create a continuous circular surface around a majority of the middle plate 204 and/or bottom plate 206. The outer diameter 226 of the O-rings 102 are held generally in line with the first circumferential surface 218.

Figure 8:
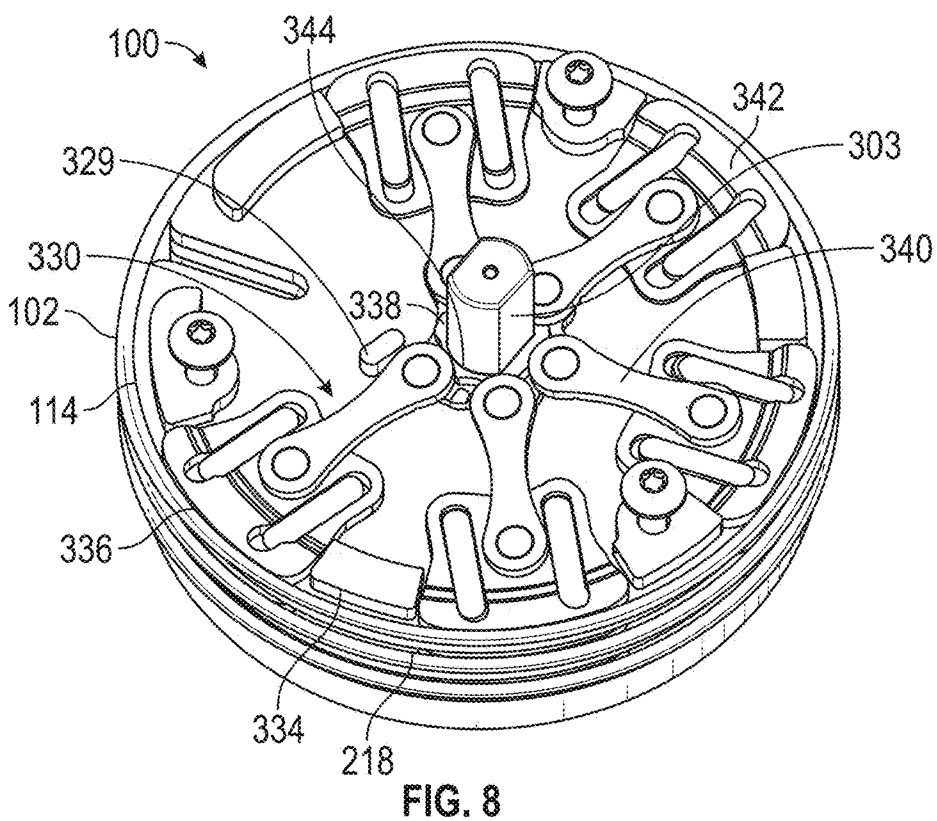
FIG. 8 is a view like FIG. 7, but showing the actuation mechanism in a fully extended position.

FIG. 8 is an isometric view of an O-ring installation device 100 with the top plate 202 removed and in a fully extended position. As can be seen, the actuator shaft 303 has been pivoted within the actuator hole 344, and has engaged the actuator mechanism 330.

As shown, the rotational member 338 has been pivoted until it has contacted the limiter 329, the limiter 329 preventing further pivoting of the rotational member 338. The movement of the rotational member 338 has moved the links 340, the links 340 having shifted the retention members 342 from the resting position to the fully extended position. The links 340 are shown having been pivoted such that they are parallel with the retention members 342.

While in the fully extended position, the second engagement surface 336 is extended radially outwards past the first engagement surface 334, such that it is generally in line with the first circumferential surface 218. The extension of the second engagement surface 336 has pushed the O-rings 102 outwards, removing slack within the O-rings 102 and disengaging them from the first engagement surface 334. Accordingly, the inner diameter 114 of the O-rings 102 is also generally in line with the first circumferential surface 218.

Figure 9:
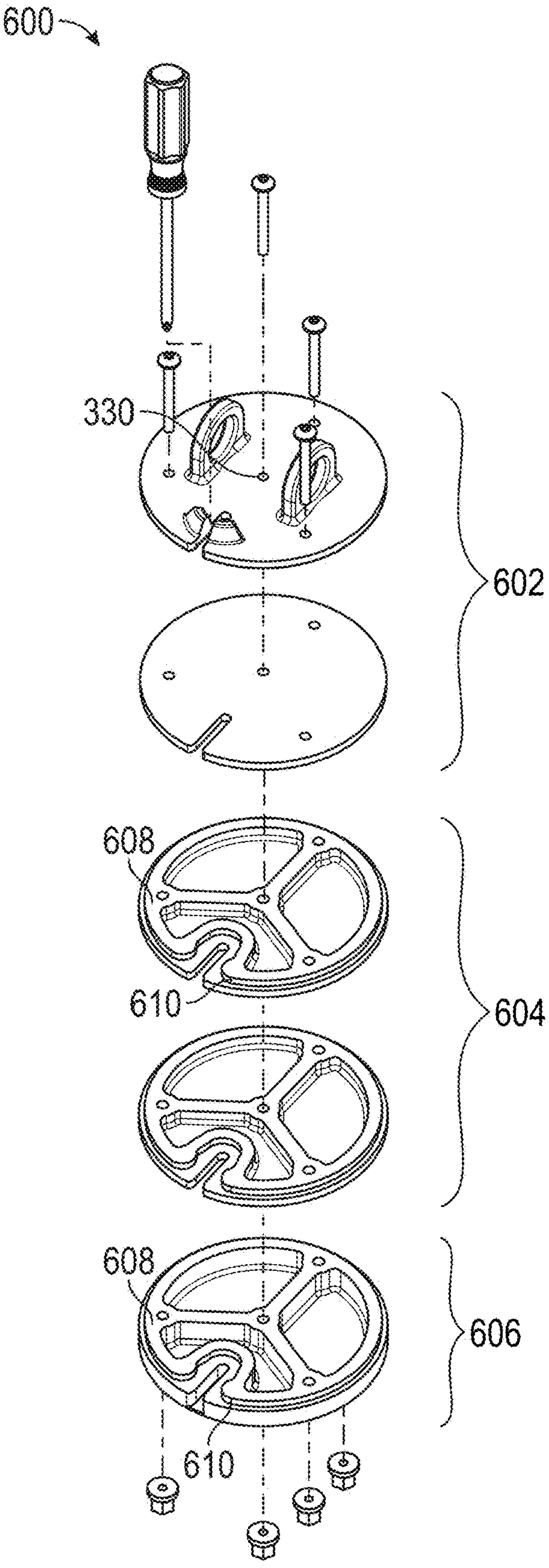
FIG. 9 is an exploded view of an alternative version of an O-ring installation device.

FIG. 9 shows an exploded view of an alternative O-ring installation device 600. The alternate device 600 is substantially similar to the O-ring installation device 100, and includes a top plate 602, a plurality of middle plates 604, and a bottom plate 606.

As for the top plate 602, the alternative device 600 no longer includes an actuator handle 116, an actuator catch 120, or an actuator hole 344. Instead, the top plate 202 has an additional fastener bore 300 in place of the actuator hole 344.

As for the middle plates 604 and bottom plate 606, the alternative embodiment no longer includes the plurality of retention paths 328 or actuation mechanism 330, and the plurality of plate guides 326 have been replaced by a singular static guide 608. The static guide 608 extends from each of the middle plates 604 and bottom plate 606 in a circular pattern around a majority of the respective middle plates 604 and bottom plate 606. The guide 608 includes a static engagement surface 610 disposed proximal to a static circumferential surface 612. The static engagement surface 610 is configured to engage an inner diameter 114 of an O-rings 102 and position it such that an outer diameter 226 of the O-ring 102 is generally in line with the static circumferential surface 612 but does not extend past the static circumferential surface 612.

Similarly to the combination of the first engagement surfaces 334 and second engagement surfaces 336, the static guide 608 may contact the majority of the O-ring 102 when the O-ring is installed on the static guide 608. For example, the static guide 608 may be generally 340 degrees, with the slot 209 accounting for the remainder generally 20 degrees.

Figure 10:
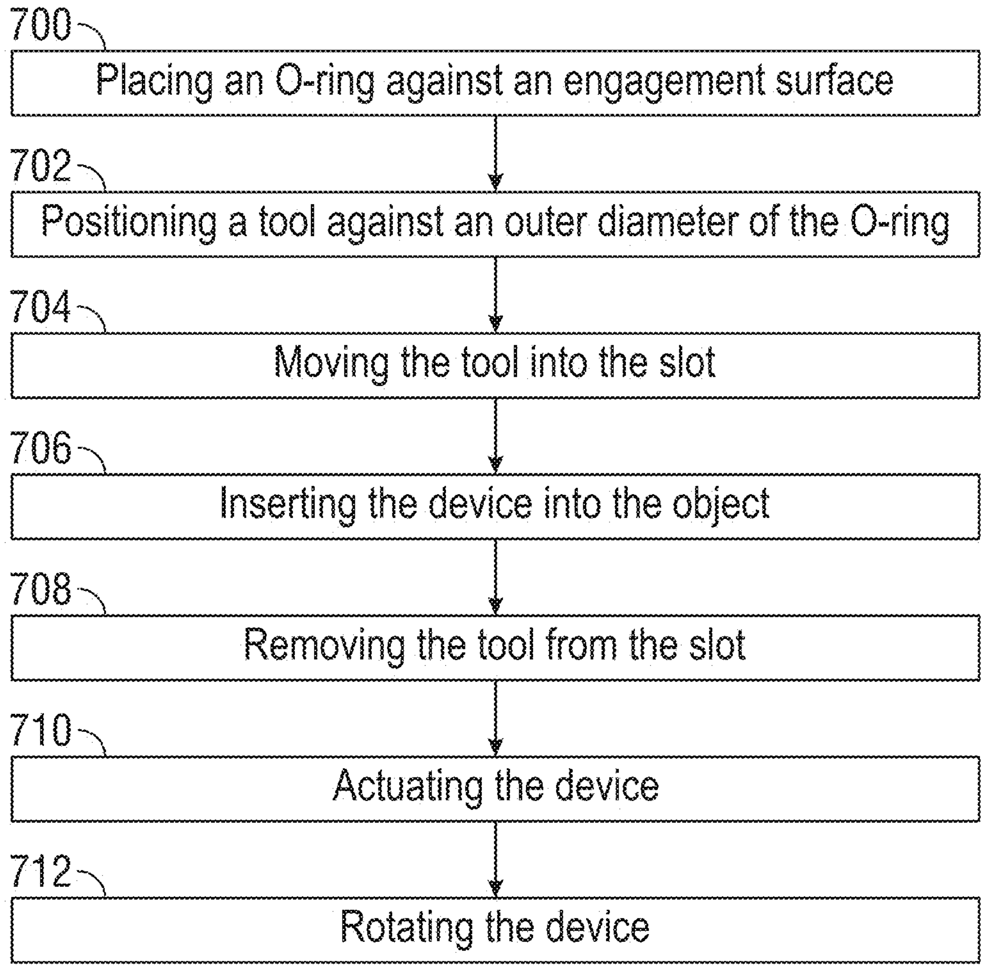
FIG. 10 is a flowchart detailing an O-ring installation process using an O-ring installation device.

FIG. 10 is a flow chart detailing a method of using an O-ring installation device 100. Generally, steps 700-704 describe engaging the O-ring 102 with the device 100, while steps 706-714 describe the installation of the O-rings 102 into the object. Although detailed as a single O-ring 102 installation process, multiple O-rings 102 may be installed simultaneously using the same steps described below.

At step 700, an O-ring 102 is disposed against the engagement surfaces, 334 and 336. During this step the O-ring 102 is wrapped around the device 100 and placed within the notch 222 and against the engagement surfaces, 334 and 336.

At step 702, the tool 210 is positioned at the entrance of the slot 209. During this step, the O-ring 102 is held in position against the engagement surfaces, 334 and 336, while the tool 210 is pressed against the outer diameter 226 of the O-ring 102. The tool 210 is then used to push a loose portion of the O-ring 102 towards the slot 209.

At step 704, the tool 210 is moved into the slot 209. During this step, the tool 210 pulls the loose portion of the O-ring 102 into the slot 209 and towards the plate axis 200, removing slack within the O-ring 102. The O-ring 102 is subsequently drawn against the engagement surfaces, 334 and 336.

As the slot 209 bisects the tool 210 catch, at some point, the tool 210 may need to be lifted such that any portion too wide to pass through the slot 210 in the tool catch 224 passes over the tool catch 224. Prior to being completely past the tool catch 224, the slack in the O-ring 102 is eliminated, and further movement of the tool 210 into the slot 209 may cause the O-ring 102 to stretch. When the slack is removed, the outer diameter 226 of the O-ring 102 does not extend out past the circumferential surfaces, 218 and 220.

At this point, the tool 210 is ready to be inserted into the object. However, in situations where the tool 210 may need to be transported, or the operator does not wish to hold the tool 210 in the current position, the tool 210 may be further moved such that it is completely past the tool catch 224. At this point, the tool 210 may be engaged with tool catch 224 and the third slot segment 366 to hold the tool 210 roughly parallel with the plate axis 200. In this position, the O-ring 102 attempts to push the tool 210 out of the slot 209, and the tool catch 224 and the third slot segment 366 engage the tool 210, restricting movement out of the slot 209.

At step 706, the tool 210 is inserted into the object. During this step, at least one of the circumferential surfaces, 218 and 220, are inserted into the object such that the O-ring 102 is held in line with a groove 110 of the object. Ideally, the device 100 is designed for the particular object, such that the device 100 may be inserted into the object until the mating surface 216 contacts the object, and the O-ring 102 is aligned with the groove 110 in that position.

At step 708, the tool 210 is removed from the slot 209. During this step, if the tool 210 is held by the tool catch 224 and/or the third slot segment 366, the tool 210 is moved generally upwards in line with the plate axis 200 such that it is no longer held by the tool catch 224 and/or within the third slot segment 366. The tool 210 is then passed through the slot 209 towards the circumferential surfaces, 218 and 220, releasing the tension on the O-ring 102. Once the tension is released, the tool 210 is moved generally upwards in line with the plate axis 200 until the tool 210 is completely out of the slot 209.

At step 710, the device 100 is actuated. During this step, the actuator shaft 303 is pulled upwards along the plate axis 200 within the actuator hole 344 until the actuator stop 118 is out of the actuator catch 120, at which point the actuator shaft 303 is pivoted. The pivoting of the actuator shaft 303 pivots the rotational member 338, the rotational member 338 pushing each of the links 340 into their respective retention member 342. This pushes the retention members 342 from the resting position to the fully actuated position. The movement of the retention members 342 pushes the O-ring 102 outwards, and ultimately past the circumferential surfaces, 218 and 220.

At step 712, the device 100 is rotated. During this step, the device 100 is rotated within the object while remaining in the same position relative to the object. The rotation allows portions of the O-ring 102 not currently engaged with one of the retention members 342 to engage one of the retention members 342. The engagement with the retention members 342 assists with pushing additional portions of the O-ring 102 away from the device 100. Generally, the rotation is at least 15 degrees, however additional rotation may further assist seating the O-ring 102.

At step 714, the device 100 removed from the object and reset. During this step, the device 100 may be rotated as it is pulled upwards along the plate axis 200 out of the object. Once clear of the object, the actuator shaft 303 is rotated such that the actuator stop 362 rests within the actuator catch 120. Such rotation also returns the retention members 342 to the resting position.

INDUSTRIAL APPLICABILITY

The above disclosure is an O-ring installation device 100 for placing one or more O-rings 102 simultaneously within one or more grooves 110 of an inner diameter 114 of an object, such as an engine block 104. The plate guides 326 on the device 100, as well as the retention members 342, are shaped and located such that the device 100 is generally able to hold a majority of the O-ring 102 as wide as possible without the O-ring 102 extending past a circumferential surface, 218 and 220, of the device 100.

Accordingly, the device 100 minimizes the amount of slack required to be taken out of an O-ring 102 prior to installation into the object. This allows the device 100 to include a smaller slot 209 and increases the amount of the O-ring 102 that may be positioned against a guide 326 or retention member 342. As such, the O-ring 102 requires less expansion to move into the slot 209 of the object, such that installation is easier and faster, while also further reducing the chance for the O-ring 102 to be pinched, cut, twisted, or otherwise damaged.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of the disclosure. Such embodiments should be understood to fall within the scope of the present disclosure as determined based upon the claims and any equivalents thereof.

What is claimed is:

1. A device for installing a plurality of O-rings within a cylinder, the device comprising:
- a top plate disposed along a plate axis and including:
  - a perimeter surface;
  - a top face opposite a bottom face;
  - a tool catch extending outwards from the top face, the tool catch disposed proximal to the perimeter surface; and
  - a first slot extending through the perimeter surface and towards a center of the top plate, the first slot splitting the tool catch into a plurality of tool catch segments;
- a central plate disposed along the plate axis and including:
  - a first circumferential surface;
  - a second slot extending through the first circumferential surface towards the plate axis;
  - a top surface opposite a bottom surface; and
  - a first guide extending from the top surface, the first guide disposed proximal to the first circumferential surface and including a first engagement surface configured to engage an inner portion of one of the O-rings and position it such that an outer portion of the O-ring is generally in line with the first circumferential surface but does not extend past the first circumferential surface; and
- a bottom plate disposed along the plate axis and including:
  - a second circumferential surface having the same diameter as the first circumferential surface;
  - a top side opposite a bottom side;
  - a groove extending through a portion of the first circumferential surface and the top side and towards a plate axis of the bottom plate; and
  - a second guide extending from the top side, the second guide disposed proximal to the second circumferential surface and including a second engagement surface configured to engage an inner surface of a different O-ring than first engagement surface and position it such that an outer surface of the O-ring is generally line with the second circumferential surface but does not extend past the second circumferential surface.

2. The device of claim 1, wherein the top surface and bottom surface define a first thickness, and the top side and the bottom side define a second thickness, the second thickness greater than the first thickness.

3. The device of claim 1, wherein each of the slots and grooves extend in a straight line towards the plate axis.

4. The device of claim 1, wherein the tool catch has an angled surface configured to hold different sizes of tools within the slot.

5. The device of claim 1, further including a first land formed between the first engagement surface and the first circumferential surface, wherein the width of the land is substantially identical at most portions of the land.

6. The device of claim 5, wherein the land is between (SPECIFIC WIDTH FOR CYLINDER APPLICATION?) inches wide.

7. The device of claim 1, wherein each engagement surface is configured to contact a majority of the inner surface of its respective O-ring.

8. The device of claim 1, further including a slot guide, the slot guide spaced back from an internal surface of the slot such that the O-ring does not contact a majority of the slot guide.

* * * * *